(12) United States Patent
Wu

(10) Patent No.: US 7,609,465 B2
(45) Date of Patent: Oct. 27, 2009

(54) EMI-PROOF MINIATURE LENS FOCUSING MECHANISM

(75) Inventor: Fu-Yuan Wu, Yangmei Taoyuan (TW)

(73) Assignee: TDK Taiwan Corporation, Taipei (TW)

( * ) Notice: Subject to any disclaimer, the term of this patent is extended or adjusted under 35 U.S.C. 154(b) by 0 days.

(21) Appl. No.: 12/042,450

(22) Filed: Mar. 5, 2008

(65) Prior Publication Data

US 2009/0225452 A1 Sep. 10, 2009

(51) Int. Cl.
*G02B 7/02* (2006.01)
(52) U.S. Cl. ...................... 359/819; 359/823
(58) Field of Classification Search ............... 359/819, 359/823
See application file for complete search history.

(56) References Cited

U.S. PATENT DOCUMENTS 7,400,463 B1 * 7/2008 Wu ........................... 359/824

* cited by examiner

*Primary Examiner*—Jordan M. Schwartz
*Assistant Examiner*—James C Jones
(74) *Attorney, Agent, or Firm*—Muncy, Geissler, Olds & Lowe, PLLC

(57) ABSTRACT

An EMI-proof miniature lens focusing mechanism includes a frame having four magnets mounted therearound; a lens holder holding a miniature lens therein and being enclosed in a winding element; at least one elastic element having a fixed outer portion connected to the frame and a movable inner portion connected to the lens holder so that the lens holder is elastically and movably suspended within the frame; an upper and a lower cover located above and below the frame to assist in connecting the elastic element to the frame; and a metal housing enclosing an assembly of the upper cover, the elastic element, the lens holder, the frame, and the lower cover. The metal housing is provided at a bottom with at least one conducting plate for grounding, so that electromagnetic effects on external environment are eliminated and electromagnetic interference and electrostatic charge from external environment are isolated.

7 Claims, 5 Drawing Sheets

EMI-PROOF MINIATURE LENS FOCUSING MECHANISM

FIELD OF THE INVENTION

The present invention relates to a miniature lens focusing mechanism, and more particularly to an EMI-proof miniature lens focusing mechanism that is electromagnetically driven to achieve lens focusing but is constructed to comply with rules and regulations concerning electromagnetic interference (EMI), electromagnetic compatibility (EMC), and electrostatic discharge (ESD).

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. In a miniature lens, there are many different auto-focusing driving mechanisms. Among others, voice coil motor (VCM) is the currently most widely adopted auto-focusing driving mechanism. The VCM has the advantages of small volume, low power consumption, accurately actuated displacement, and cost-effective, and is therefore very suitable for short-distance driving in miniature lens auto-focusing.

FIG. 1 schematically shows a conventional lens focusing mechanism 200 consisting of a lens assembly 201 and a photo sensor 202. With the lens assembly 201, light reflected from an object can form an image on the photo sensor 202. In the case a distance between the lens assembly 201 and the photo sensor 202 is fixed, that is, the lens assembly 201 is a fixed focal lens, only the object located more than two to three meters away from the lens (i.e., located at a hyper focal distance) can be clearly shown on the camera. If it is desired to own the macro shooting function, it is necessary to use an additional lens focusing unit to displace the lens assembly 201, so as to change the distance between the lens assembly 201 and the photo sensor 202 and thereby achieve the purpose of focusing.

In the case the lens assembly 201 is provided with the zoom function, multiple lens groups inside the lens assembly 201 must also be displaced corresponding to the changes in zoom ratio. In this case, the lens focusing mechanism must also be included in the lens module to enable the displacement of the lens groups.

In the conventional focusing mechanism, the lens assembly is displaced mainly via a manually controlled mechanism, and is therefore not so convenient for operation. When the lens is electromagnetically driven, it is possible to achieve the function of automatic focusing and to simplify the design of the lens focusing mechanism. However, the electromagnetically driven lens focusing mechanism would cause the problem of electromagnetic interference (EMI). For the electromagnetically driven lens focusing mechanism to be widely applied on mobile phones, notebook computers, and personal digital assistants (PDAs) that are required to comply with the rules and regulations concerning electromagnetic interference (EMI), electromagnetic compatibility (EMC), and electrostatic discharge (ESD), it is necessary to overcome the EMI problem with the electromagnetically driven lens focusing mechanism.

Therefore, it is tried by the inventor to develop an EMI-proof miniature lens focusing mechanism that not only has simplified mechanism design, reduced manufacturing cost, and improved assembly process, but also complies with the rules and regulations concerning EMI, EMC, and ESD, and can therefore be applied in the camera modules for mobile phones, notebook computers, and PDAs.

SUMMARY OF THE INVENTION

A primary object of the present invention is to provide an EMI-proof miniature lens focusing mechanism, which includes a miniature lens and a lens holder being electromagnetically driven to achieve the function of focusing, and has the advantages of good driving performance, high assembly accuracy, and being protected against electromagnetic effects.

To achieve the above and other objects, the EMI-proof miniature lens focusing mechanism according to the present invention includes a frame having four magnets mounted therearound; a lens holder holding a miniature lens thereto and enclosed in a winding element; at least one elastic element having a fixed outer portion connected to the frame and a movable inner portion connected to the lens holder, so that the lens holder is elastically and movably suspended within the frame; an upper and a lower cover located above and below the frame to assist in connecting the elastic element to the frame; and a metal housing enclosing an assembly of the upper cover, the elastic element, the lens holder, the frame, and the lower cover. The metal housing is provided at a bottom with at least one conducting plate electrically connected to a ground, so as to avoid the electromagnetic effects on external environment and shield the lens focusing mechanism against external electromagnetic interference and electrostatic charge.

The elastic element is made of a metal material, and is provided with an extension section, which is downward bent by 90 degrees to serve as a positive/negative electrode plate, via which electric current may be supplied to the winding element. With the current supply electrode plate integrally formed with the elastic element, the space required for the lens focusing mechanism may be reduced.

When the lens holder is not driven to move, it is subject to a downward stress generated by the elastic element to downward bear against a top of the lower cover, so that the lens holder is always held in place by the downward stress of the elastic element, no matter the lens holder is initially positioned to face upward, downward, or sideward.

The lens holder is provided at four lower corners with a downward extended stopper each, and the lower cover is provided at positions corresponding to the stoppers with a rotation restricting recess each, into which the stoppers may be extended to thereby prevent the lens holder from rotating due to an external force.

In a most preferred embodiment of the present invention, there is further included at least one movable-portion protecting plate connected to the movable inner portion of the elastic element. The movable-portion protecting plate is provided at an outer peripheral edge with at least one radially projected lug. And, the upper cover has a central opening corresponding to an outer peripheral edge of the movable-portion protecting plate, and is provided along the central opening with at least one recess corresponding to the lug on the movable-portion protecting plate, such that the lug is restricted to move only within the recess to thereby provide an axially linear movement guiding mechanism. As a result, the lens holder is restricted by the movable-portion protecting plate to be axially linearly displaceable only within the upper cover without the risk of rotating horizontally relative to the upper cover.

Moreover, the upper cover is provided at four lower corners with a locating boss each, and the elastic element, the frame, and the lower cover are correspondingly provided at respective four corners with locating holes for the locating bosses to extend therethrough, so that the upper cover, the elastic element, the frame, and the lower cover are held in place relative to one another and highly accurately assembled to one another.

Finally, the metal housing is further provided at the lower end with at least one pair of symmetrical hooking legs, and the lower cover is provided with a pair of symmetrical retainers corresponding to the pair of hook legs. With the engagement of the hook legs with the retainers, the metal housing is firmly held to the lower cover.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
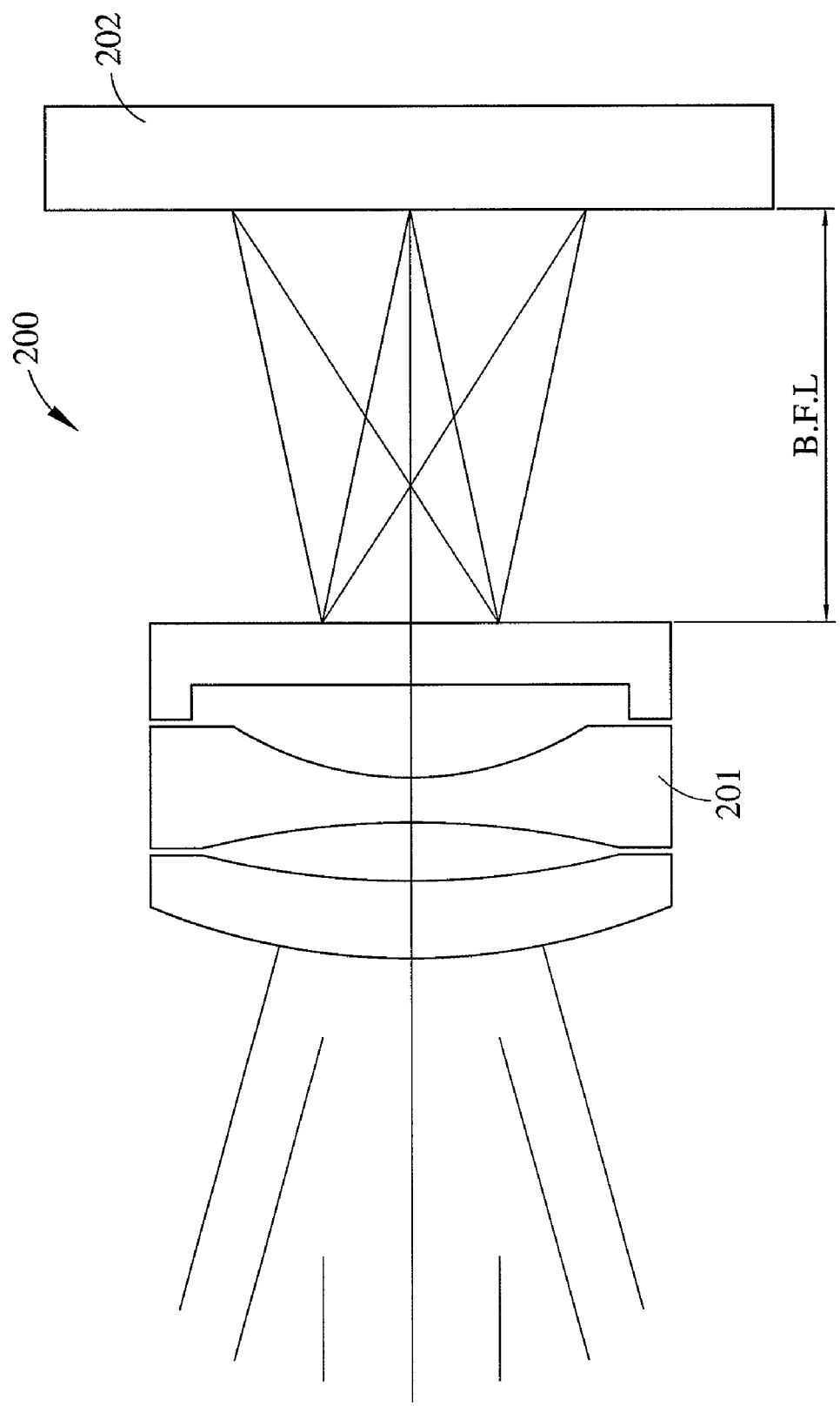
FIG. 1 shows a conventional automatic lens focusing mechanism.
Figure 2:
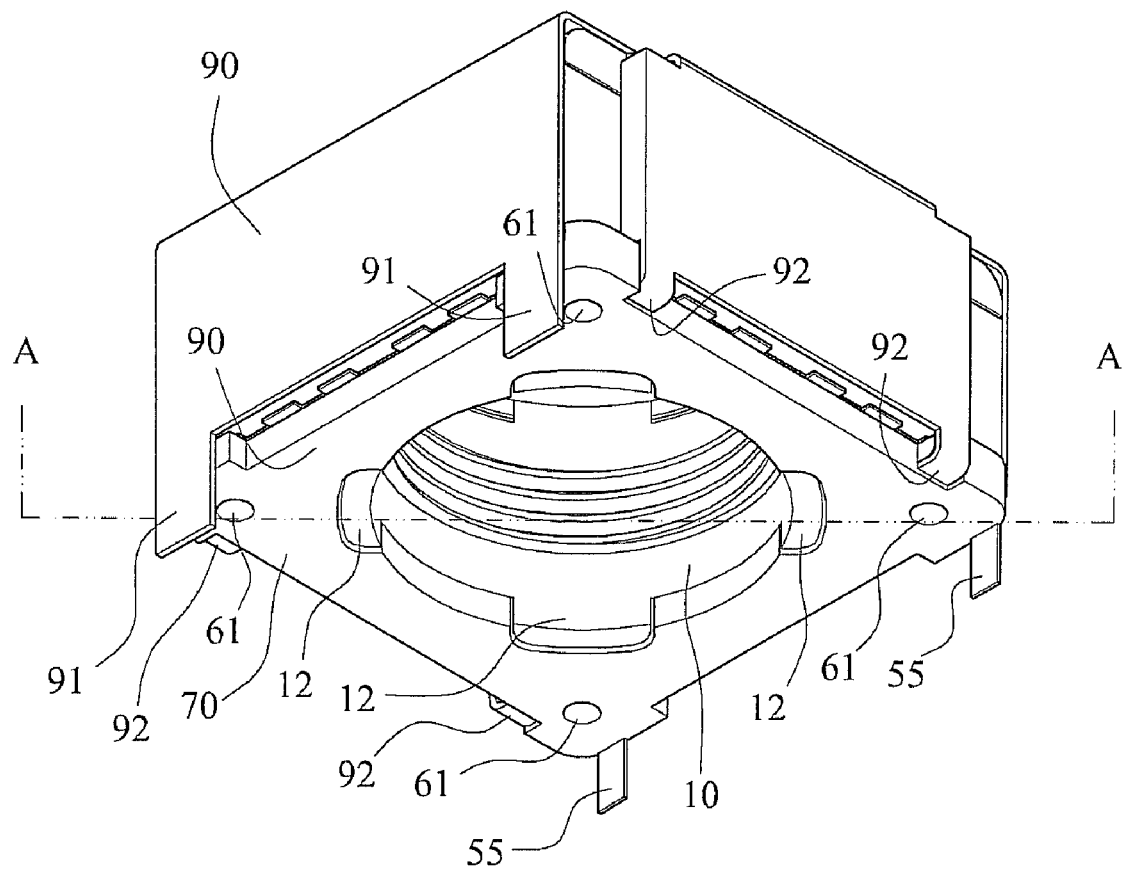
FIG. 2 is an assembled bottom perspective view of an EMI-proof miniature lens focusing mechanism according to the present invention.
Figure 3:
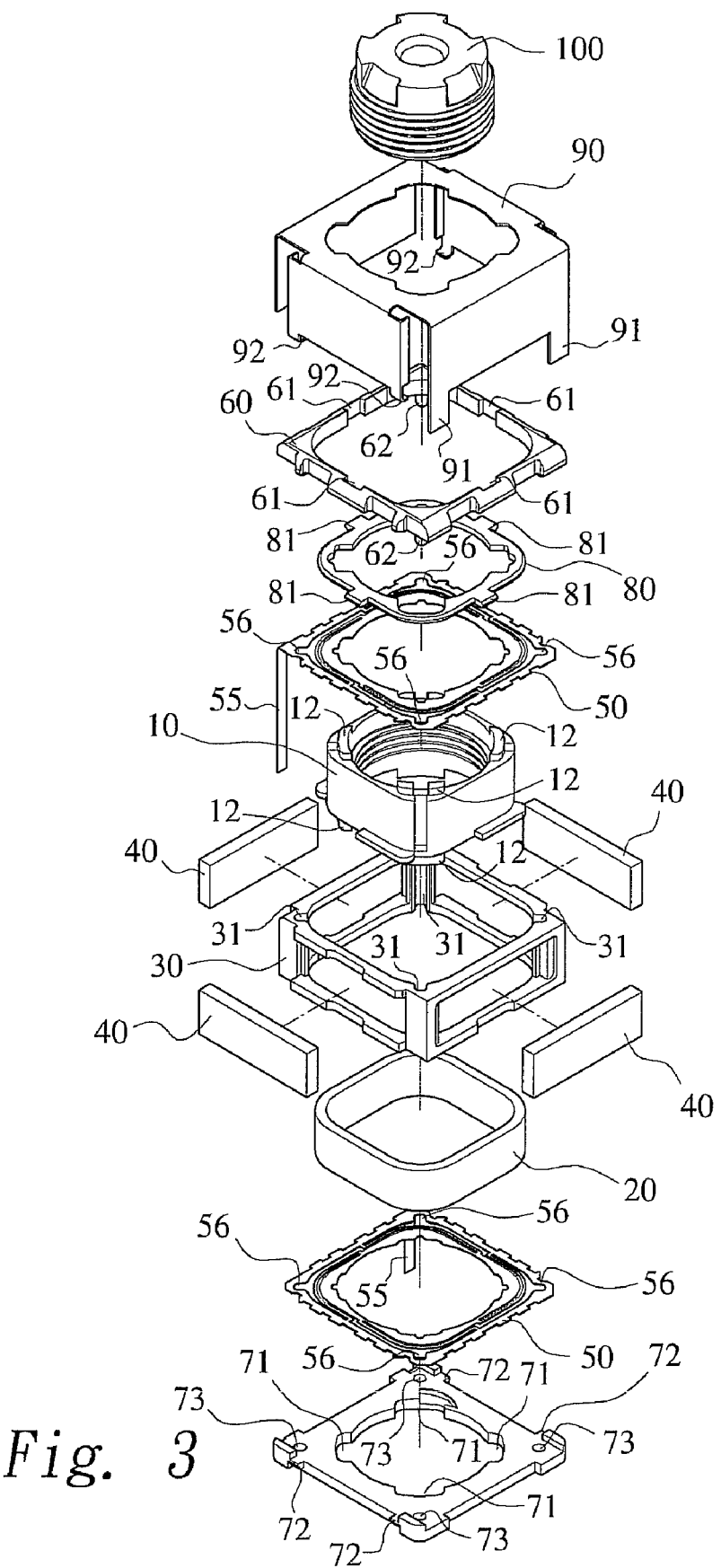
FIG. 3 is an exploded top perspective view of the EMI-proof miniature lens focusing mechanism of FIG. 2.

Please refer to FIG. 2 that is an assembled bottom perspective view of an EMI-proof miniature lens focusing mechanism according to the present invention, and to FIG. 3 that is an exploded top perspective view of FIG. 2. As shown, the EMI-proof miniature lens focusing mechanism of the present invention includes a lens holder 10, a winding element 20, a frame 30, four magnetic elements 40, at least one elastic element 50, an upper cover 60, a lower cover 70, a movable-portion protecting plate 80, a metal housing 90, and a miniature lens 100.

The lens holder 10 is used to hold the miniature lens 100 therein. For this purpose, the lens holder 10 is a hollow member defining an axially extended and internally threaded central opening for engaging with screw threads provided on an outer surface of the lens 100, so that the lens 100 may be screwed to the central opening of the lens holder 10.

The frame 30 is a hollow member having four equal vertical sides. The four magnetic elements 40, such as four magnets, are separately set in the openings formed on the four vertical sides of the frame 30. The lens holder 10 is received in a central space enclosed in the hollow frame 30, and is limited to axially linearly displace in the frame 30 without rotating or moving sidewardly relative to the frame 30.

Figure 4:
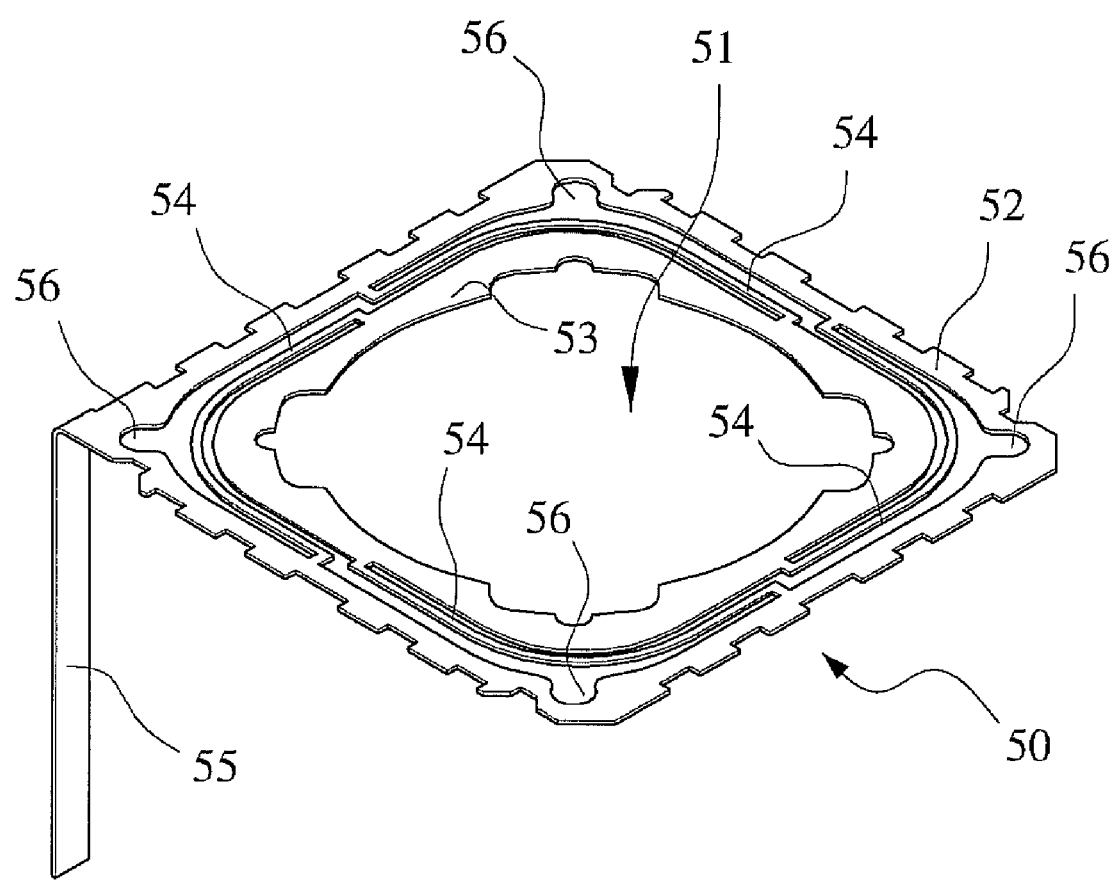
FIG. 4 is a perspective view of an elastic element used in the present invention.

Please also refer to FIG. 4, which is a perspective view of the elastic element 50. As shown, the elastic element 50 is in the form of a flat plate having a central portion cut away to provide a round opening 51 corresponding to the axial central opening of the lens holder 10. The elastic element 50 has a fixed outer portion 52 and a movable inner portion 53. The movable inner portion 53 is connected to the fixed outer portion 52 via four substantially L-shaped narrow bands 54, such that the elastic element 50 forms a plate spring having a fixed outer portion and a movable inner portion. In a preferred embodiment of the present invention as illustrated in the accompanying drawings, there are provided two elastic elements 50, namely, an upper plate spring and a lower plate spring. The fixed outer portions 52 of the upper and lower plate springs 50 are connected to upper and lower ends of the frame 30, respectively; and the movable inner portions 53 of the upper and lower plate springs 50 are connected to upper and lower ends of the lens holder 10, respectively. Being supported by the upper and lower plate springs 50, the lens holder 10 is suspended in the central space of the frame 30. With the four L-shaped narrow bands 54 elastically connecting the movable inner portion 53 to the fixed outer portion 52 on each of the two elastic elements 50, forces applied to the lens holder 10 in X, Y, and Z directions caused by impact, vibration, and falling of a camera, on which the miniature lens focusing mechanism is mounted, may be effectively absorbed by the L-shaped connecting bands 54.

The elastic elements 50 are made of a metal material, and are further provided with an extension section 55 each. The extension sections 55 may be bent downward by 90 degrees for electrically connecting to a circuit board (not shown) to serve as a positive and a negative electrode plate, via which electric current may be supplied to the winding element 20. With the current supply electrode plates being integrally formed with the elastic elements 50, the space required for the lens focusing mechanism may be reduced.

Figure 5:
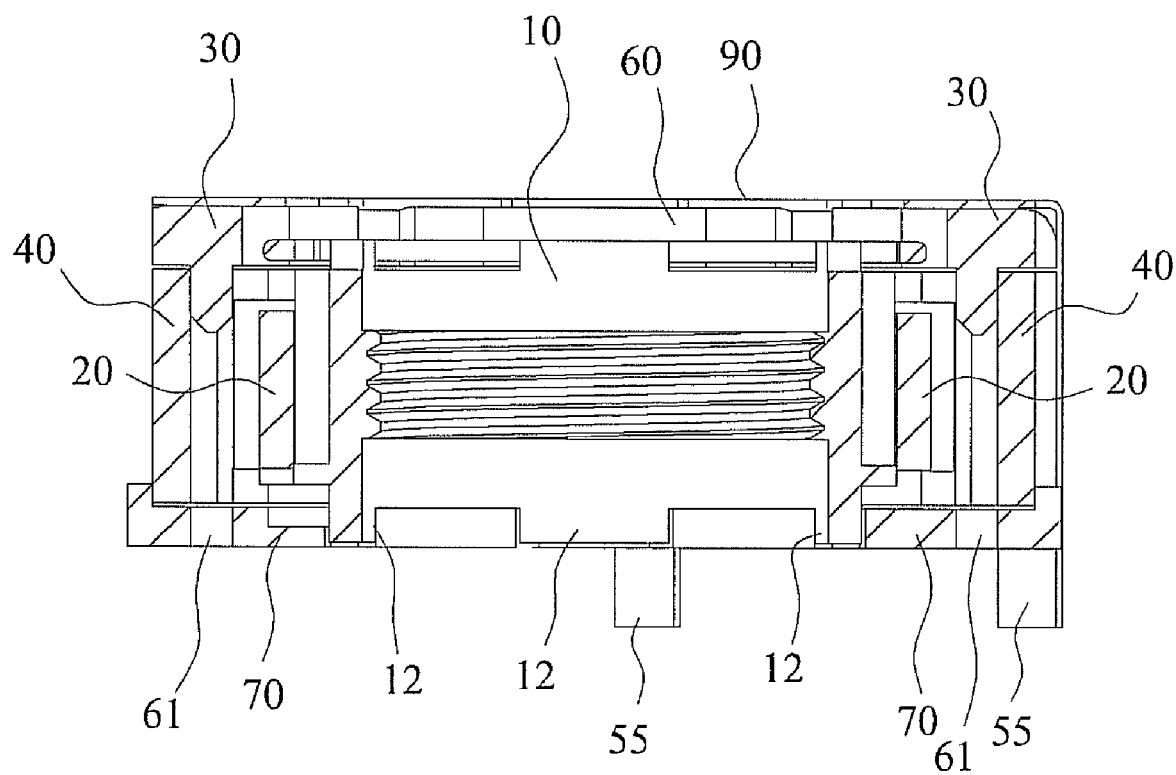
FIG. 5 is a sectional view taken along line A-A of FIG. 2.

The upper and the lower cover 60, 70 are located above and below the frame 30, respectively, to assist in connecting the elastic elements 50 to the upper and lower ends of the frame 30. FIG. 5 is a sectional view taken along line A-A of FIG. 2. Please refer to FIGS. 3 and 5 at the same time. When the lens holder 10 is not driven to move, it is subject to a downward stress generated by the elastic elements 50 to downward bear against a top of the lower cover 70, so that the lens holder 10 is always held in place by the downward stress of the elastic elements 50, no matter the lens holder 10 is positioned to face upward, downward, or sideward. That is, the lens holder 10 will not be vibrated or displaced in a direction perpendicular to an axis thereof, no matter in what direction its initial position is.

The lens holder 10 is provided at four lower corners with a downward extended stopper 12 each, and the lower cover 70 is provided at positions corresponding to the stoppers 12 with a rotation restricting recess 71 each, such that the stoppers 12 may be extended into the rotation restricting recesses 71 to prevent the lens holder 10 from rotating due to an external force.

The movable-portion protecting plate 80 is located between the upper cover 60 and the lens holder 10 to connect to the inner movable portion 53 of the upper elastic element 50, so as to move along with the lens holder 10. The upper cover 60 has a central portion cut away to form an opening corresponding to an outer peripheral edge of the movable-portion protecting plate 80. The movable-portion protecting plate 80 is provided on its outer peripheral edge with at least one radially projected lug 81, and the upper cover 60 is provided along the central opening with at least one recess 61 corresponding to the lug 81, such that the lug 81 is restricted to move only within the recess 61 to thereby provide an axially linear movement guiding mechanism. As a result, the lens holder 10 is restricted by the movable-portion protecting plate 80 to be axially linearly displaceable only within the upper cover 60 without the risk of rotating horizontally relative to the upper cover 60.

The upper cover 60 is provided at four lower corners with a locating boss 62 each; and the elastic elements 50, the frame 30, and the lower cover 70 are correspondingly provided at respective four corners with locating holes 56, 31, and 73 for the locating bosses 62 to extend therethrough and received therein. With these arrangements, the upper cover 60, the elastic elements 50, the frame 30, and the lower cover 70 may be held in place relative to one another and highly accurately assembled together.

The metal housing 90 encloses the assembly of the lens holder 10, the frame 30, the elastic elements 50, the upper cover 60, and the lower cover 70. The metal housing 90 is provided at a lower end with at least one conducting plate 91. Since the metal housing 90 is electrically conductive, the conducting plate 91 may be electrically connected to a ground of the circuit board (not shown). By grounding the metal housing 90, electromagnetic effects produced by the winding element 20 and the magnetic elements 40 can be eliminated, and external EMI and ESD can be isolated.

The metal housing 90 is also provided at the lower end with at least one pair of symmetrical hooking legs 92, and the lower cover 70 is correspondingly provided with at least one pair of symmetrical retainers 72 for engaging with the hook legs 92 to thereby tightly hold the metal housing 90 to the lower cover 70.

When the EMI-proof miniature lens focusing mechanism of the present invention is driven to operate, electric current is supplied to the winding element 20 via the elastic elements 50, so that the winding element 20 produces a magnetic field and accordingly, a push force to drive the lens holder 10 to linearly move in an axial direction within the frame 30, so that the miniature lens 100 held in the lens holder 10 is brought to a focused position to complete the focusing.

In brief, the present invention provides an EMI-proof miniature lens focusing mechanism, which includes a miniature lens and a lens holder being electromagnetically driven to achieve the function of focusing, and has the advantages of good driving performance, high assembly accuracy, and being protected against electromagnetic effects.

The present invention has been described with a preferred embodiment thereof and it is understood that many changes and modifications in the described embodiment can be carried out without departing from the scope and the spirit of the invention that is intended to be limited only by the appended claims.

What is claimed is:

1. An EMI-proof miniature lens focusing mechanism, comprising:
    a frame in the form of a hollow member having four equal vertical sides, each of the four vertical sides having a central opening for receiving a magnetic element therein;
    a lens holder in the form of a hollow member internally defining an axially extended opening for holding a miniature lens therein, and being enclosed in a winding element;
    at least one elastic element being in the form of a flat plate and having a central portion cut away to provide a round opening corresponding to the axial opening of the lens holder; the elastic element including a fixed outer portion and a movable inner portion connected to the fixed outer portion via four substantially L-shaped narrow bands; and the fixed outer portion being connected to the frame, and the movable inner portion being connected to the lens holder, such that the lens holder is elastically and movably supported on the elastic element and suspended in the hollow frame;
    an upper and a lower cover being located above and below the frame, respectively, to assist in connecting the at least one elastic element to the frame; and
    a metal housing enclosing an assembly of the upper cover, the elastic element, the lens holder, the frame, and the lower cover; the metal housing being provided at a lower end with at least one conducting plate for electrically connecting to a ground, so that electromagnetic effects produced by the winding element and the magnetic elements on external environment can be eliminated, and EMI and ESD from external environment can be isolated.

2. The EMI-proof miniature lens focusing mechanism as claimed in claim 1, wherein there are two elastic elements to provide an upper plate spring and a lower plate spring; the fixed outer portions of the upper and lower plate springs being connected to upper and lower ends of the frame, respectively; and the movable inner portions of the upper and lower plate springs being connected to upper and lower ends of the lens holder, respectively.

3. The EMI-proof miniature lens focusing mechanism as claimed in claim 1, wherein the elastic element is made of a metal material, and is provided with an extension section; the extension section being downward bent by 90 degrees to serve as a positive/negative electrode plate via which electric current is supplied to the winding element.

4. The EMI-proof miniature lens focusing mechanism as claimed in claim 1, wherein the lens holder is provided at four lower corners with a downward extended stopper each, and the lower cover is provided at positions corresponding to the stoppers with a rotation restricting recess each, into which the stoppers may be extended.

5. The EMI-proof miniature lens focusing mechanism as claimed in claim 1, further comprising a movable-portion protecting plate being located between the upper cover and the lens holder to connect to the movable inner portion of the elastic element, and being provided at an outer peripheral edge with at least one radially projected lug; and wherein the upper cover has a central opening corresponding to an outer peripheral edge of the movable-portion protecting plate, and is provided along the central opening with at least one recess corresponding to the lug on the movable-portion protecting plate, such that the lug is restricted to move only within the recess to thereby form an axially linear movement guiding mechanism.

6. The EMI-proof miniature lens focusing mechanism as claimed in claim 1, wherein the upper cover is provided at four lower corners with a locating boss each, and the elastic element, the frame, and the lower cover are correspondingly provided at respective four corners with locating holes for the locating bosses to extend therethrough and received therein, so that the upper cover, the elastic element, the frame, and the lower cover are held in place relative to one another.

7. The EMI-proof miniature lens focusing mechanism as claimed in claim 1, wherein the metal housing is provided at the lower end with at least one pair of symmetrical hooking legs, and the lower cover is correspondingly provided with at least one pair of symmetrical retainers for engaging with the hook legs to thereby hold the metal housing to the lower cover.

* * * * *